(12) United States Patent
Vulpitta

(10) Patent No.: US 8,146,748 B2
(45) Date of Patent: Apr. 3, 2012

(54) PACKAGING COMPRESSION WRAP

(75) Inventor: Brian Vulpitta, Avon Lake, OH (US)

(73) Assignee: Shurtech Brands, LLC, Avon, OH (US)

( * ) Notice: Subject to any disclaimer, the term of this patent is extended or adjusted under 35 U.S.C. 154(b) by 469 days.

(21) Appl. No.: 12/123,187

(22) Filed: May 19, 2008

(65) Prior Publication Data

US 2008/0289302 A1 Nov. 27, 2008

(51) Int. Cl.
*B65D 81/02* (2006.01)
(52) U.S. Cl. .......... 206/594; 206/591; 206/524
(58) Field of Classification Search .......... 206/524, 206/584, 522, 591, 594, 523; 426/108, 112; 426/618, 625
See application file for complete search history.

(56) References Cited

U.S. PATENT DOCUMENTS

| | | | |
|---|---|---|---|
| 2,649,958 A * | 8/1953 | Rausch | 206/584 |
| 2,669,351 A | 2/1954 | Carson et al. | |
| 2,968,576 A | 1/1961 | Keller et al. | |
| 3,066,382 A | 12/1962 | Zweigle et al. | |
| 3,188,264 A | 6/1965 | Holden | |
| 3,229,814 A | 1/1966 | Cowman | |
| 3,250,383 A | 5/1966 | Smitter | |
| 3,360,420 A | 12/1967 | Paul et al. | |
| 3,389,534 A * | 6/1968 | Pendleton | 53/550 |
| 3,503,177 A * | 3/1970 | Kropscott et al. | 53/474 |
| 3,511,899 A | 5/1970 | Miller et al. | |
| 3,536,190 A | 10/1970 | Hirsch et al. | |
| 3,552,466 A * | 1/1971 | Fairchilds | 206/386 |
| 3,556,815 A * | 1/1971 | Fugiwara | 26/120 |
| 3,582,363 A * | 6/1971 | Jones | 26/410 |
| 3,608,707 A | 9/1971 | Miller | |
| 3,630,821 A | 12/1971 | Miller et al. | |
| 3,835,280 A * | 9/1974 | Gades et al. | 219/728 |
| 3,889,743 A * | 6/1975 | Presnick | 165/46 |
| 3,989,853 A | 11/1976 | Forkner | |
| 4,091,852 A * | 5/1978 | Jordan et al. | 383/3 |
| 4,193,499 A * | 3/1980 | Lookholder | 206/524 |
| 4,284,372 A | 8/1981 | Smith | |
| 4,448,309 A | 5/1984 | Roccaforte et al. | |
| 4,620,633 A * | 11/1986 | Lookholder | 206/523 |
| 4,851,246 A * | 7/1989 | Maxwell et al. | 426/107 |

(Continued)

FOREIGN PATENT DOCUMENTS

DE 4028345 A1 * 3/1992

(Continued)

*Primary Examiner* — David Fidei
(74) *Attorney, Agent, or Firm* — Fay Sharpe LLP; Karl W. Hauber

(57) ABSTRACT

A packaging device is provided for an item of three-dimensional shape comprising a non-porous deformable outer wrap characterized in being deformable in three dimensions to at least partially surround the item of three-dimensional shape therein. The device includes a mass of loose fill elements disposed within the outer wrap and can occupy a first volume in a first storage state sufficient to permit the packaging device to be stored. The device further provides that the mass of elements disposed within the outer wrap can occupy a second volume in a second use state to shape about the item of three dimensional shape and to permit the elements to deform within the outer wrap to accommodate the three-dimensional shape of the item. The outer wrap and the elements disposed within the outer wrap are biodegradable. The elements are adapted to change from the first storage state of unpopped corn kernels to the second use state of popped popcorn kernels.

17 Claims, 4 Drawing Sheets

U.S. PATENT DOCUMENTS

| | | | |
|---|---|---|---|
| 4,892,744 A | | 1/1990 | Ylvisaker |
| 5,009,318 A | * | 4/1991 | Lepinoy ............... 206/524.8 |
| 5,127,525 A | | 7/1992 | Hummer |
| 5,180,060 A | | 1/1993 | Forti et al. |
| 5,188,691 A | | 2/1993 | Caputo |
| 5,188,880 A | | 2/1993 | Tether |
| 5,211,482 A | | 5/1993 | Tilman |
| 5,245,389 A | | 9/1993 | Yoshiyama et al. |
| 5,409,777 A | | 4/1995 | Kennedy et al. |
| 5,439,730 A | | 8/1995 | Kelly et al. |
| 5,453,310 A | | 9/1995 | Andersen et al. |
| 5,469,966 A | | 11/1995 | Boyer |
| 5,515,975 A | | 5/1996 | Jarvis et al. |
| 5,540,972 A | | 7/1996 | Jaegers et al. |
| 5,558,930 A | | 9/1996 | DiPoto |
| 5,564,570 A | * | 10/1996 | Jaszai ................. 206/523 |
| 5,589,518 A | | 12/1996 | Bastioli et al. |
| 5,620,096 A | * | 4/1997 | Pozzo ................. 206/450 |
| 5,624,035 A | * | 4/1997 | Kim ................... 206/522 |
| 5,631,052 A | | 5/1997 | Andersen et al. |
| 5,641,068 A | | 6/1997 | Warner |
| 5,654,048 A | | 8/1997 | Andersen et al. |
| 5,738,216 A | | 4/1998 | Warner |
| 5,769,231 A | * | 6/1998 | Batsford ............... 206/522 |
| 5,788,078 A | | 8/1998 | Fuss |
| 5,801,207 A | | 9/1998 | Bastioli et al. |
| 5,804,030 A | | 9/1998 | Jaegers et al. |
| 5,819,942 A | * | 10/1998 | Sadow ................ 206/522 |
| 5,826,404 A | * | 10/1998 | Fuss et al. .............. 53/459 |
| 5,830,548 A | | 11/1998 | Andersen et al. |
| 5,836,450 A | | 11/1998 | Gonzales |
| 5,901,850 A | | 5/1999 | Jones |
| 5,915,556 A | | 6/1999 | Simpson |
| 5,958,549 A | | 9/1999 | Jaegers et al. |
| 5,996,798 A | | 12/1999 | Gessert |
| 6,106,753 A | | 8/2000 | Redd et al. |
| 6,245,367 B1 | | 6/2001 | Galomb |
| 6,254,490 B1 | | 7/2001 | Lawson et al. |
| 6,334,534 B1 | * | 1/2002 | Hollingsworth et al. ..... 206/320 |
| 6,530,480 B1 | | 3/2003 | Hardy |
| 7,208,215 B2 | | 4/2007 | Lin |
| 2002/0187287 A1 | | 12/2002 | Cooper |
| 2003/0057128 A1 | | 3/2003 | Hardy |
| 2005/0003150 A1 | | 1/2005 | Lin |
| 2005/0139509 A1 | | 6/2005 | Bussey |
| 2006/0286325 A1 | | 12/2006 | Swoboda et al. |

FOREIGN PATENT DOCUMENTS

WO      WO 9204253 A1 * 3/1992

* cited by examiner

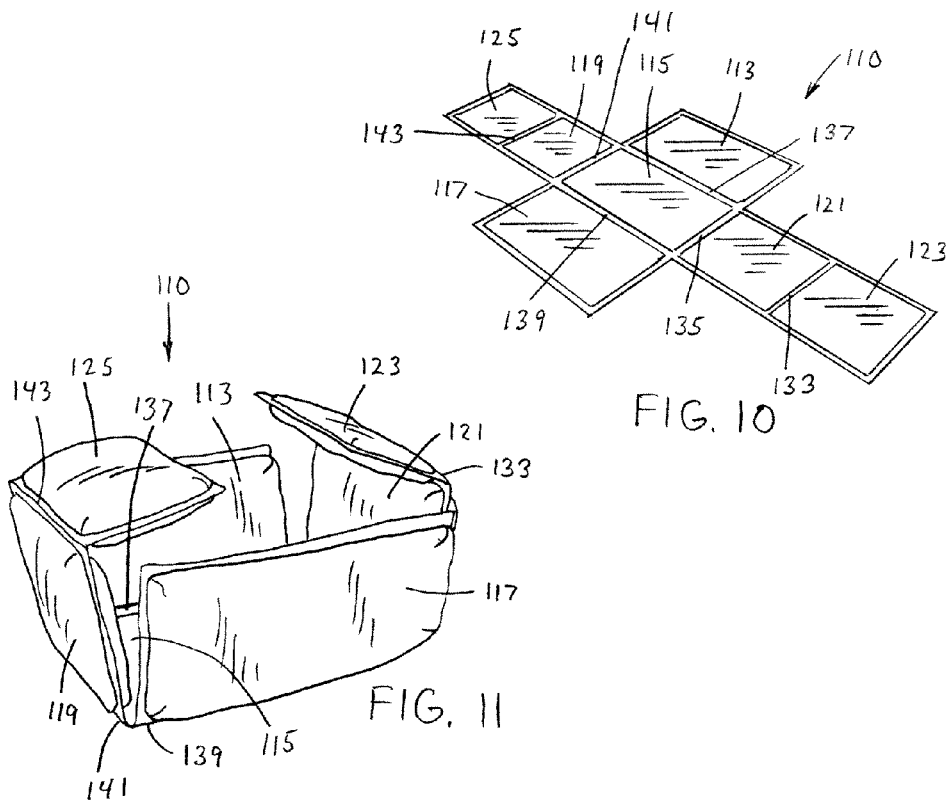
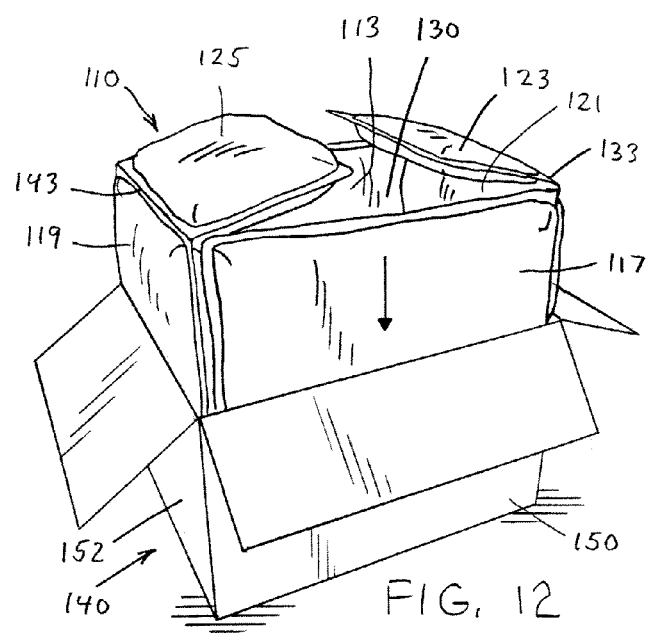

PACKAGING COMPRESSION WRAP

BACKGROUND

This disclosure relates to a packaging device. More particularly, this disclosure relates to a packaging device using loose fill packaging elements in a first, storage, or deflated orientation and in a second, use, or inflated orientation.

As is known, various types of materials have been used for shipping fragile items in shipping containers of various types. In some cases, loose fill elements of foamed plastic are poured into a container to form a cushioning layer and then the item to be transported is placed on top of the loose fill elements. This is followed by pouring additional loose fill elements into the container to completely surround the item being packaged. Upon arrival at the ultimate destination, a user opens the container in order to remove the item. In doing so, the loose fill elements are usually first separated so that the item can be exposed and then the item is removed from the container. This generally creates at least three problems.

First, upon opening of the container and separation of the loose fill elements to access the packaged item, the loose fill elements generally spill over and out of the container. These loose fill elements must then be collected, generally, manually and placed back into the container for disposal purposes. This can be bothersome and time consuming.

Second, the loose fill elements usually have static electricity that causes the elements to stick to the hands and clothing of the user as well as to other surfaces outside the container. Thus, these elements also have to be manually removed and placed back into the container.

Third, the disposal of foamed plastic creates a burden on landfills and the environment due to the fact that the material is not biodegradable.

In other cases, foamed-in-place materials have been used. In these cases, an item is placed in a shipping carton and then a foamable material is directed into the container about the item so that upon foaming, the material molds to the shape of the item. However, this type of packaging technique is cumbersome and relatively expensive.

Packaging materials, in many situations, typically constitute a greater volume than the volume of the item to be transported.

SUMMARY

According to one aspect of the present disclosure, a packaging device is provided for an item of three-dimensional shape comprising a non-porous deformable outer wrap characterized in being deformable in three dimensions to at least partially surround the item of three-dimensional shape therein. The device includes a mass of loose fill elements disposed within the outer wrap and can occupy a first volume in a first storage state sufficient to permit the packaging device to be stored. The device further provides that the mass of elements disposed within the outer wrap can occupy a second volume in a second use deformable state to shape about the item of three dimensional shape and to permit the elements to deform within the outer wrap to accommodate the three-dimensional shape of the item. The outer wrap and the elements disposed within the outer wrap are biodegradable. The mass of elements are adapted to change from the first storage state of unpopped corn kernels to the second use deformable state of popped popcorn kernels.

According to another aspect of the present disclosure, a packaging device is provided for an item of three-dimensional shape comprising a deformable outer wrap having an exterior shell and an interior shell. The interior shell can define and surround an enclosed space within and is characterized in being deformable in three dimensions to at least partially surround the item of three-dimensional shape therein. The exterior shell defines a substantially planar configuration in a storage orientation and a substantially rectilinear configuration in a use orientation for lining the inside surfaces of a shipping container. The exterior shell lines at least five of the inside surfaces of the shipping container. The device further provides a mass of loose fill elements disposed within the outer wrap. The mass of elements occupying an amount of available space sufficient to permit the packaging device to be shaped about the item of three dimensional shape, and to permit the fill elements to deform within the outer wrap to accommodate the three-dimensional shape of the item and to envelop the item therein. The loose fill elements can include unpopped corn kernels in the storage orientation and popped popcorn kernels in the use orientation.

According to still another aspect of the disclosure, a method of packaging an item of three-dimensional shape is provided comprising providing an outer wrap including a plurality of individual compartments wherein each one of the compartments is hingedly connected to at least another one of the compartments. The method further provides for filling the outer wrap with a mass of loose fill elements disposed within and occupying an amount of space sufficient to permit a packaging device to be shaped about the item of three dimensional shape and to permit the fill elements to move within the outer wrap to accommodate the three-dimensional shape of the item. The method further comprises changing the fill elements from a first storage state of unpopped corn kernels to a second use state of popped popcorn kernels wherein the first state defines a substantially planar configuration and the second state defines a substantially rectilinear configuration for lining the inside surfaces of a shipping container. The packaging device defines and surrounds an enclosed space within and is characterized by being deformable in three dimensions to surround the item of three-dimensional shape therein. The method further comprises lining a majority of the inside surfaces of the shipping container with the packaging device.

BRIEF DESCRIPTION OF THE DRAWINGS

These and other aspects of the disclosure will become more apparent from the following detailed description taken in conjunction with the accompanying drawings wherein:

FIG. 10 illustrates a second embodiment of a packaging device in a storage orientation;

FIG. 11 illustrates the use state of the packaging device according to FIG. 10; and, FIG. 12 illustrates an exemplary packing arrangement of the packaging device of FIG. 11 being deposited into the shipping container.

DETAILED DESCRIPTION

The disclosure provides a packaging device 10 comprised of a non-porous deformable outer wrap, bag, or membrane 12 defining an enclosed space and a mass of loose fill elements 14 disposed within the outer wrap 12 and occupying an amount of space sufficient to permit the outer wrap 12 to be shaped about an item of three dimensional shape to be packaged and to permit the elements 14 to move, compress, and or deform within the outer wrap 12 to accommodate the three dimensional shape of the item. According to one exemplary arrangement, the membrane 12 and the mass of elements 14 can both be made of biodegradable and/or recycled materials, for example, recycled paper and corn kernels, respectively.

Figure 1:
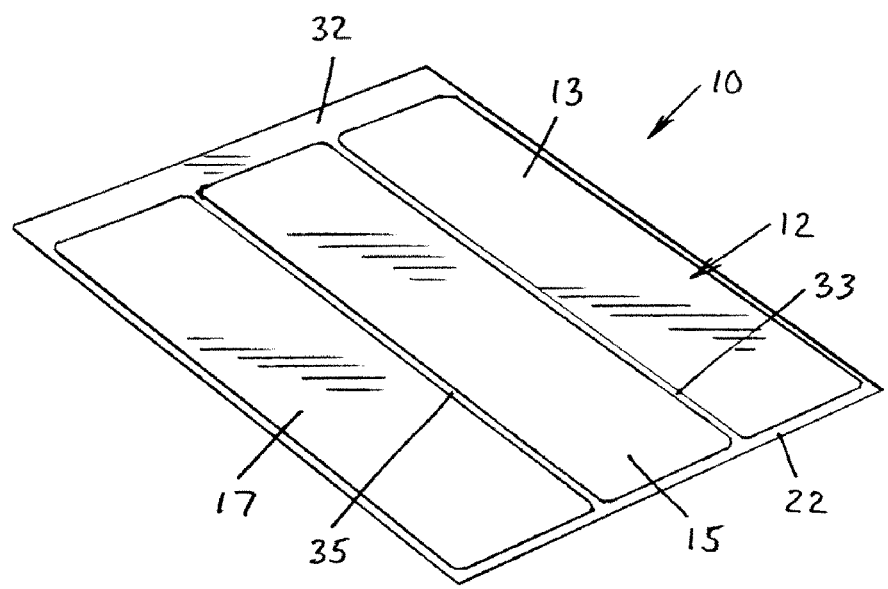
FIG. 1 illustrates a first embodiment of a first or storage state of a packaging device in an unfolded or planar orientation.
Figure 2:
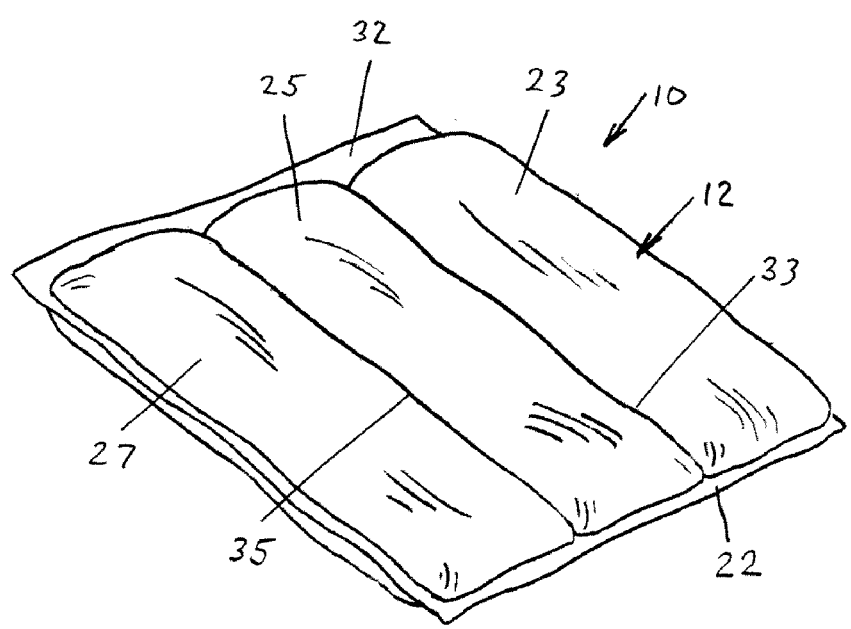
FIG. 2 illustrates a second or use state of the packaging device.
Figure 3:
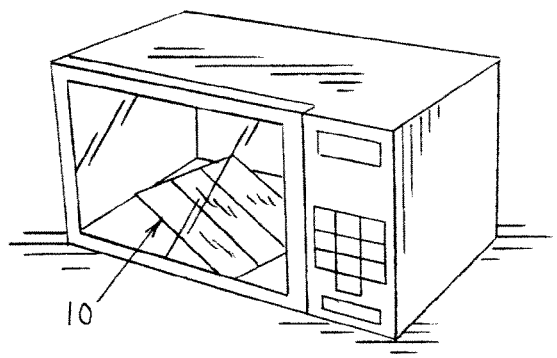
FIG. 3 displays one method for transforming or changing the packaging device from the first state to the second state.
Figure 4:
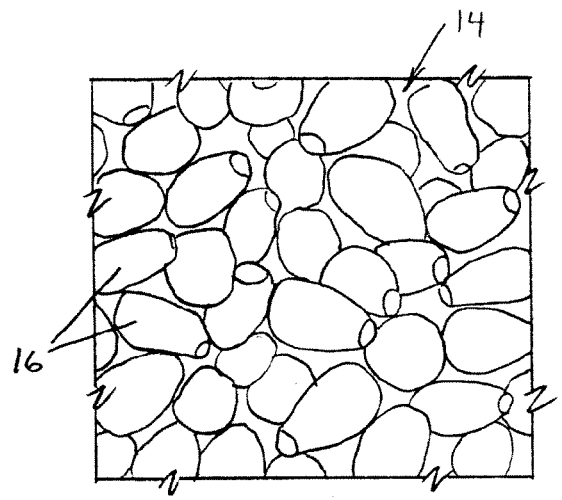
FIG. 4 illustrates a mass of loose fill elements in their storage state.
Figure 5:
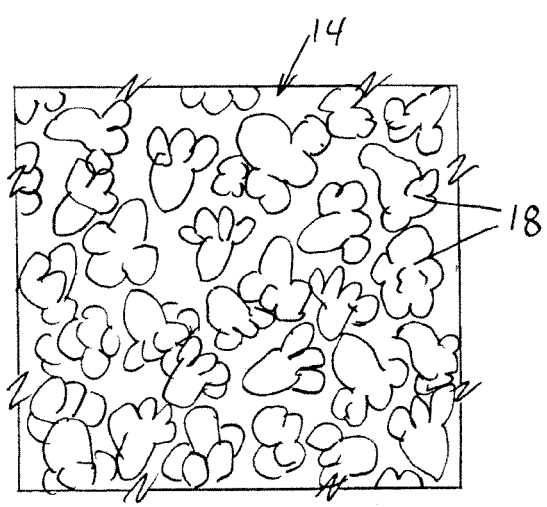
FIG. 5 illustrates a mass of loose fill elements in their use state.
Figure 6:
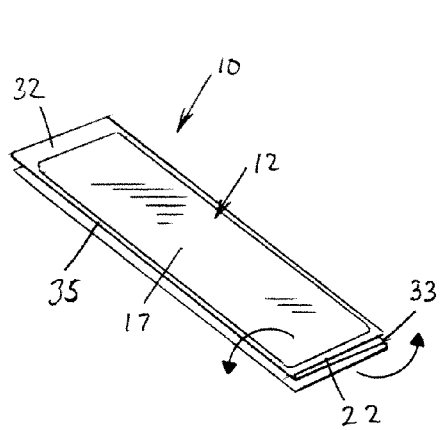
FIGS. 6-8 illustrate the packaging device, according to FIG. 1, going from an initial folded storage orientation (FIG. 6), to an unfolded substantially planar orientation (FIG. 7), and then to a use orientation (FIG. 8), respectively.
Figure 7:
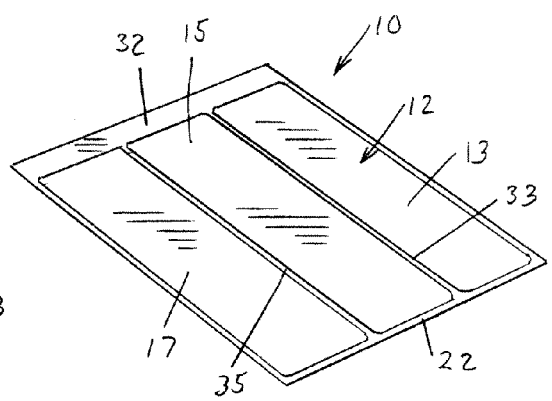
Figure 8:
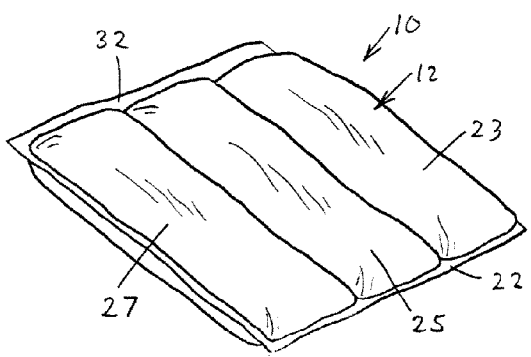

Referring now to FIGS. 1-9, wherein a first embodiment of the packaging device 10 is therein shown. The outer wrap 12 can be characterized by being deform able in three dimensions. That is to say, the bag 12 may first be substantially folded (FIG. 6) or substantially planar (unfolded) (FIG. 1 and FIG. 7) in its first deflated orientation with unpopped corn kernels 16, for example, contained therein. The mass of loose fill elements 16 can occupy a volume of available space within the outer wrap 12 of less than 30 percent. Upon microwaving or heating, the kernels 16 pop or expand and transform into another form, i.e. popcorn 18. The popcorn 18 can then occupy a larger volume of available space within the outer wrap 12. This larger volume can be from about 60 percent to about 90 percent of the available space. After the popcorn kernels have popped, more of the available space within the outer wrap is consumed which can cause the outer wrap to expand and take on a more rectilinear or pillowy configuration (FIGS. 3 and 8).

It is to be appreciated that device 10 can be deformable in three dimensions. That is to say, the bag may be deformed from a substantially planar orientation or shape into a substantially curvilinear or rectilinear orientation shape, for example, a three-dimensional shape having a pocket, or a shape to envelop, or partially envelop, an item, such as a sphere, cube, or other regular or random shape. It is to be appreciated that the bag 12 can be deformed from the planar, curvilinear, or rectilinear orientation into a variety of shapes to envelop, partially envelop, or overlay an item, such as a sphere, cube, or other regular or random shape.

Although not illustrated, a single packaging device may be used for packaging an item. In this respect, the item to be packaged is placed on the outer wrap and the outer wrap shaped about the item. The enveloped item may then be placed in a box, shipping container, or carton in a snug fit manner. After closing, the box or carton may then be transported.

The outer wrap 12 can be typically formed as a hollow section, tube, or compartment, or series of compartments 13, 15, 17, in any conventional manner. One end 22 of the outer wrap 12 can be closed, for example by a heat seal crimping. The outer wrap 12 can have a multitude of equally sized compartments 13, 15, 17 thereby distributing the mass of elements contained therein in a more uniform manner. After the loose fill 14 elements have been placed into their respective compartments 13, 15, 17, the remaining end 32 (or ends) of the bag 12 can then be closed in a similar manner, for example by a second heat seal crimping.

The loose fill elements 14 do not completely fill the available volume inside of the membrane 12 in either the stored or use orientation. In the stored or non-use orientation, the mass of fill elements 16 can comprise a minority of the available volume of the deflated compartments 13, 15, 17 of the outer layer 12. In the use or inflated orientation, the loose fill elements 18 can occupy a majority of the available volume of the inflated compartments 23, 25, 27 of the membrane 12. Allowing some excess volume capacity prevents the heat seams 22, 32 from leaking and thus maintains an aroma free packaging device 10. The non-porous bag 12 can be formed and sealed such that the bag is ventless. The ventless bag thus prevents any aroma of the mass of elements 14 to be leaked into the shipping container. It is to be appreciated that creating an aroma free environment inside a shipping container 40 discourages insect and/or rodent infestation and damage.

Alternatively, the bag 12 can include a one way vent or valve (not shown) for allowing air to enter as an aid in changing the loose fill elements 14 from the first state 16 to the second state 18. Another alternative arrangement can provide for a two way vent or valve (not shown) whereby air can enter and exit the bag 12. The expelled air can be tainted, masked, or scented (via, for example, hot peppers) from a source placed within the bag thereby discouraging infestation by repelling insects and other vermin.

The loose fill elements 14 can be made of popcorn kernels 18 or other biodegradable material such as pork grind pellets. As such, the packaging device 10 can deform or compress from the inflated orientation down to nearly the deflated volume, if desired, in order to accommodate the item to be packaged.

Referring again to FIGS. 6-8, in order to package an item, at least one packaging device 10 is unfolded from its stored or deflated orientation (FIG. 7) and then subjected to microwaves. The resultant orientation (FIG. 8) comprises an inflated device, which can include any number of individual compartments, i.e. 13, 15, 17. The individual compartments can be hingedly connected along seams 33, 35 such that the compartments 13, 15, 17 are able to move and rotate relative to one another. Although not shown, it is to be appreciated that the hinged seams 33, 35 allow the device 10 to move from a planar orientation, to a curvilinear orientation, and/or to a rectilinear orientation (and vice versa), as desired, to provide enveloping support to the item to be packaged. The inflated devices can then be placed into the shipping container 40 in and around the perimeter 42, for example, to protect an item therein.

Figure 9:
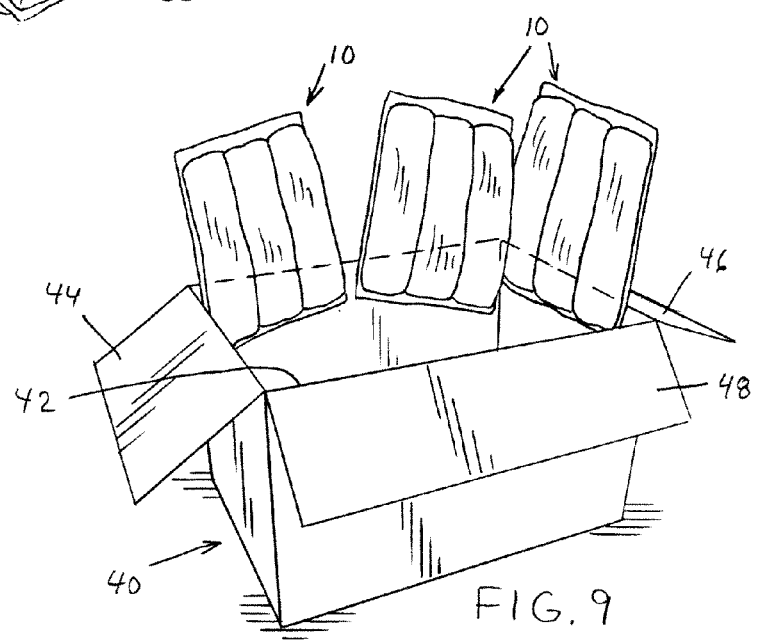
FIG. 9 illustrates one exemplary packing arrangement of the packaging device, employing several packaging devices constructed in accordance with the disclosure, being deposited into a shipping container.

Referring to FIG. 9, the packaging device(s) 10 can be deposited into the shipping container 40 of conventional structure so that the packaging devices 10 are snugly fit within the container 40. To this end, the packaging devices 10 can be compressed and deformed about the item for example by manually manipulating the packaging devices 10. At this time, the elements 18 freely shift and compress within the membrane 12 to accommodate the reshaping of the packaging devices 10. A plurality of flaps 44, 46, 48 on the container 40 may then be closed so as to push down on the packaging devices 10 such that the item is maintained in a non-movable condition within the container 40. At this time, the packaging devices 10 compress only as much as is necessary and are received in a snug fit manner in the container 40 to maintain the item in a non-movable manner.

The closed shipping container (not shown) may then be shipped to an ultimate user in any suitable manner. Upon arrival, the ultimate user would simply open the container 40 and remove the packaging devices 10 and enveloped item. The packaging devices 10 would then be unwrapped from the item and the item retrieved. The packaging devices 10 of loose fill elements 18 are then placed back into the container 40 for disposal purposes. Alternatively, the packaging device 10 of loose fill elements 18 may be reused for packaging purposes of another item by the user.

Since the loose fill elements 18 are contained within membrane 12, there is little or no risk of the elements 18 spilling out of the container 40 when the container 40 is opened or clinging to the hands and clothing of the user.

As described above, multiple packaging devices 10 may also be used for packaging an item. For example, an item, or items, may be placed between two or more devices in a sandwich-like or alternating layers arrangement. This unit may then be placed in a shipping container for shipping purposes.

Additionally, the packaged unit may be wrapped with a shrink wrap material so that the unit is completely sealed (not illustrated). A shipping label may then be placed on the outside of the wrapped package for shipping purposes. Also, the unit may be held together by strips or bands of adhesive tape and shipped in that condition.

As another exemplary packing arrangement (not illustrated), the shipping container 40 can be provided with a first layer of packaging devices 10 on the bottom. Next, one or more items can be placed on the first packaging device layer. A second layer of packaging devices 10 can then be placed over the items. Next, a second layer of items can be placed in the container on the second packaging device layer, etc., until desired, and the flaps 44, 46, 48 of the carton 40 are then closed in the usual manner. As the flaps 44, 46, 48 of the carton 40 are closed down on the top layer of packaging devices 10, the packaging devices 10 within the carton 40 are somewhat compressed to firmly hold the packaged items in place.

It is to be appreciated that the packing arrangement of packaging devices 10 can take on a variety of orientations within the shipping container for packing purposes.

In another embodiment, a packaging device 100 can be formed into a pre-form (FIGS. 10-12) configuration defining an interior to receive an item of three-dimensional shape. As described above, an outer wrap 112 can be a non-porous bag and the loose fill elements 114 can be made of corn kernels. In order to make the pre-form, a three dimensional forming blank 111 sized and shaped to the shipping container 140 can be used. The packaging device 100 can include, for example, a four-sided (or more) device having a series of panels, sides, or compartments 113, 115, 117, 119, 121, 123, 125 wherein each side or compartment can be hingedly connected along seams 133, 135, 137, 139, 141, 143, to at least one other side. Next, the packaging device 100 is placed over the shipping container 140 and the device 100 is pressed down and alongside the sides 150, 152 of the shipping container 140. The hingedly connected panels 113, 115, 117, 119, 121, 123, 125 can be manipulated such that at least one side of the packaging device corresponds to a panel of the shipping container. The item to be packaged can then be placed into an interior area 130 created by the packaging device 110. Similar to description above, a mass of loose fill elements 18 will then compress around the item. A top side, or sides 123, 125, of the packaging device 110 can then be folded over the item therein. The top sides 123, 125 can then be placed over the item and the carton 140 closed. It is to be appreciated that the top sides 123, 125 of the packaging device 110 can comprise at least two sections 123, 125 hingedly connected at 133, 143 to different sides 121, 119, respectively, of the packaging device 110. The resultant package provides a secure device for shipping the item therewith.

When processing a packaging device 110 into a pre-form as above, the space about the forming blank can take on a box-like, or partial box-like, construction so that the pre-form takes on a rectilinear shape suitable for fitting into a carton of rectangular shape.

Alternatively, instead of using loose fill elements of corn kernels, the elements may be made of pork grind pellets or other natural (i.e. biodegradable) materials.

Accordingly, it is to be appreciated that the packaging device 10, 110 can provide a relatively simple technique and device for packaging an item with loose fill elements without the inconvenience of having the elements scatter upon opening of a container 40, 140 to remove the item.

It is another aspect of the disclosure to provide the device 10, 110 to the user with the loose fill elements in a stored orientation 16 wherein the corn kernels have yet to be popped. These unpopped, or deflated, devices (refer to FIGS. 1 and 6) can be shipped in this stored orientation with an item and can be used, for example, if the item is to be returned. If the item is to be returned, then the device 10, 110 can be changed to its use or inflated orientation, via microwaving, for example.

The disclosure thus provides a packaging device 10, 110 that which can adapt to all sizes of items to be packaged. The packaging device 10, 110 may be used to package an individual item, or a plurality of packaging devices 10, 110 may be used to package one or more items of the same or different sizes and three-dimensional shapes.

It is to be appreciated that the above disclosure provides a packaging device of loosed fill elements that can be fabricated in various sizes to accommodate the items to be packaged. The disclosure also provides a packaging device that stops sliding and migration of the packaged item or items. The disclosure further provides a packaging device that is easily removable from a shipping container, that is reusable, that provides excellent cushioning, and that is ecologically beneficial to the environment.

What is claimed is:

1. A packaging device for an item of three-dimensional shape comprising:
    a non-porous deformable outer wrap characterized in being deformable in three dimensions to at least partially surround the item of three-dimensional shape therein;
    a mass of loose fill elements reactive to a heat source and transforming within said outer wrap from a first volume to a second volume in response to said heat source;
    said mass of loose fill elements disposed within said outer wrap and occupying said first volume in a first storage state sufficient to permit said packaging device to be stored;
    said mass of elements disposed within said outer wrap occupying said second volume in a second use state to shape about the item of three dimensional shape and to permit said elements to deform within said outer wrap to accommodate the three-dimensional shape of the item;
    said outer wrap and said elements disposed within said outer wrap are biodegradable;
    wherein said elements are adapted to change within said outer wrap from said first storage state to said second use deformable state wherein said second use state is an expanded three dimensional structure;
    said outer wrap includes at least two self-contained compartments each one of said self-contained compartments hingedly connected to at least another one of said self-contained compartments for relative movement thereto;
    wherein said elements are distributed in each of said at least two self-contained compartments and occupy a minority of said space within said outer wrap in said first storage state and a majority of said space within said outer wrap in said second use state; and, wherein each of said self-contained compartments includes a portion of said elements.

2. The packaging device as set forth in claim 1, wherein said first volume is less than said second volume.

3. The packaging devices as set forth in claim 1, wherein said adaptation to change from said first state to said second state results from application of microwaves or hot air to the packaging device.

4. A packaging device for an item of three-dimensional shape comprising:

a deformable outer wrap having an expandable interior, wherein said outer wrap is ventless and biodegradable;

said outer wrap defining and surrounding an enclosed space within and characterized in being deformable in three dimensions to at least partially surround the item of three-dimensional shape therein;

said outer wrap defining a substantially planar configuration in a storage orientation and a substantially rectilinear configuration in a use orientation for lining the inside surfaces of a shipping container;

said outer wrap lines at least four of said inside surfaces of said shipping container;

a mass of loose fill elements disposed within said outer wrap and occupying an amount of said space sufficient to permit said packaging device to be shaped about the item of three dimensional shape and to permit said fill elements to deform within said outer wrap to accommodate the three-dimensional shape of the item and to envelop the item therein;

said loose fill elements include unpopped corn kernels in said storage orientation and popped popcorn kernels in said use orientation;

said outer wrap includes a plurality of self contained compartments, each one of said compartments hingedly connected to at least another one of said compartments wherein at least one of said compartments substantially corresponds to and is adjacent with at least one of said inside surfaces of said shipping container in said use orientation, and wherein said at least three compartments form a rectilinear structure; and, wherein said elements occupy a minority of said space within said outer wrap in said first storage state and a majority of said space within said outer wrap in said second use state.

5. A packaging device for an item of three-dimensional shape comprising:

an outer wrap including a plurality of individual compartments, each one of said compartments hingedly connected to at least another one of said compartments;

at least one said hingedly connected compartment pivots from about 0 degrees to about 180 degrees relative to another adjoining compartment for lining at least a portion of at least two inside surfaces of a shipping container;

said outer wrap including a mass of loose fill elements disposed within and occupying an amount of space sufficient to permit a packaging device to be shaped about the item of three dimensional shape and to permit said fill elements to move within said outer wrap to accommodate the three-dimensional shape of the item;

said elements change from a first storage state of unpopped corn kernels to a second use state of popped popcorn kernels wherein said first state defines a substantially planar configuration and said second state defines a substantially non-planar configuration for lining the at least two inside surfaces of the shipping container;

said package device defines and surrounds an enclosed space within and is deformable in three dimensions to surround the item of three-dimensional shape therein;

a majority of said inside surfaces of said shipping container is lined with said packaging device;

wherein said elements occupy less than 30% of said space within said outer wrap in said first storage state and up to 90% of said space within said outer wrap in said second use state; and, wherein said outer wrap and said elements disposed within said outer wrap are biodegradable.

6. The packaging device of claim 5, wherein changing said elements from said first state to said second state includes a heat source directed at said packaging device.

7. The packaging device of claim 5, wherein said elements comprise a natural renewable resource.

8. The packaging device of claim 5, wherein said first storage state includes a deflated orientation.

9. The packaging device of claim 5, wherein said second use state includes an inflated orientation.

10. The packaging device as set forth in claim 1, wherein said elements are selected from the group consisting of corn kernels, seeds, grains, and pork grind pellets.

11. A packaging device for an item of three-dimensional shape comprising:

a non-porous deformable outer wrap characterized in being deformable in three dimensions to at least partially surround the item of three-dimensional shape therein;

a mass of loose fill elements reactive to a heat source and transforming from a first volume to a second volume in response to said heat source;

said mass of loose fill elements disposed within said outer wrap and occupying said first volume in a first storage state sufficient to permit said packaging device to be stored;

said mass of elements disposed within said outer wrap occupying said second volume in a second use state to deform about the item of three dimensional shape and to permit said elements to deform within said outer wrap to accommodate the three-dimensional shape of the item;

said outer wrap and said elements disposed within said outer wrap are biodegradable;

wherein said elements are adapted to change from said first storage state to said second use deformable state wherein said second use state is an expanded three dimensional structure;

said outer wrap includes at least three self-contained compartments, wherein at least one of said at least three self-contained compartments includes at least a one way valve for allowing air to enter;

wherein said elements in each of said at least three self-contained compartments occupy a minority of said space in said first storage state and a majority of said space in said second use state; and, wherein each one of said at least three self contained compartments hingedly connected to at least another one of said at least three self contained compartments.

12. The packaging device as set forth in claim 1, wherein the packaging device is reusable for subsequent packaging of another item after an initial packaging of one item.

13. The packaging device as set forth in claim 1, wherein at least one of said at least three self-contained compartments includes at least a one way valve for allowing air to enter.

14. The packaging device as set forth in claim 4, wherein the packaging device is reusable for subsequent packaging of another item after an initial packaging of one item.

15. The packaging device as set forth in claim 5, wherein the packaging device is reusable for subsequent packaging of another item after an initial packaging of one item.

16. The packaging device as set forth in claim 5, wherein at least one of said at least three self-contained compartments includes at least a one way valve for allowing air to enter.

17. The packaging device as set forth in claim 11, wherein the packaging device is reusable for subsequent packaging of another item after an initial packaging of one item.

* * * * *